Sept. 27, 1960 L. C. BATES 2,954,255
BUMPER GUARD ATTACHMENT
Filed Oct. 31, 1958 2 Sheets-Sheet 1

INVENTOR.
LESTER C. BATES
BY
McMorrow, Berman & Davidson
ATTORNEYS

Sept. 27, 1960 L. C. BATES 2,954,255
BUMPER GUARD ATTACHMENT
Filed Oct. 31, 1958 2 Sheets-Sheet 2
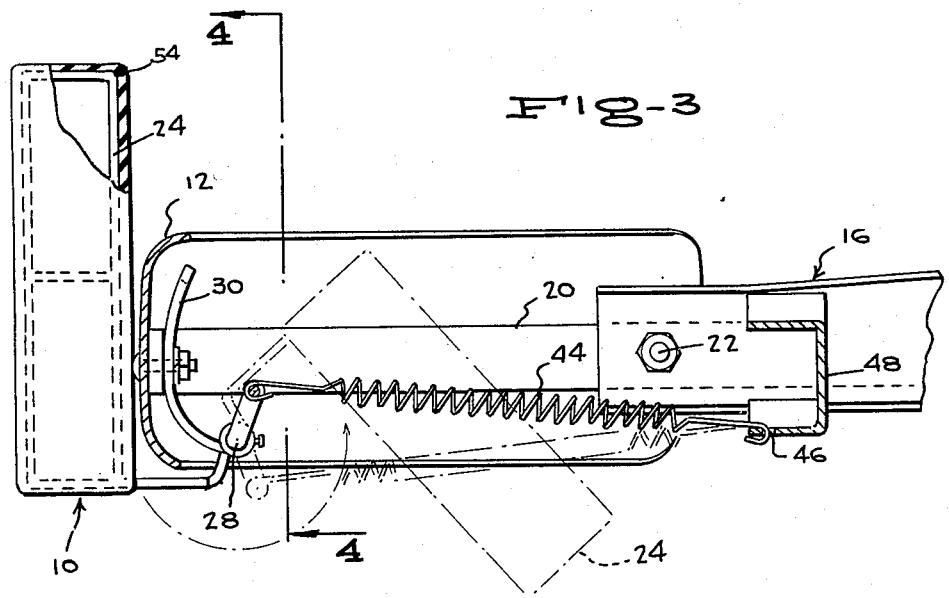
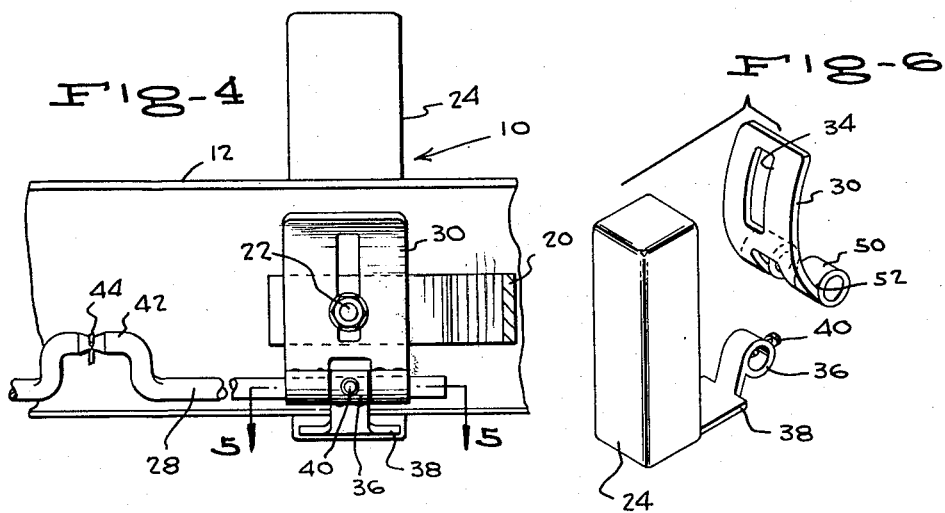
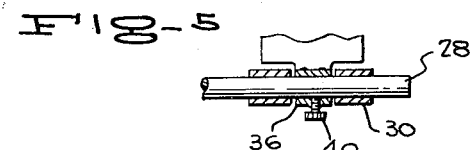
INVENTOR.
LESTER C. BATES
BY
McMorrow, Berman + Davidson
ATTORNEYS

2,954,255

BUMPER GUARD ATTACHMENT

Lester C. Bates, Raton, N. Mex.
(Box 516, Cimarron, N. Mex.)

Filed Oct. 31, 1958, Ser. No. 770,988

1 Claim. (Cl. 293—66)

The present invention relates to vehicle bumpers generally, and in particular to a bumper guard attachment.

An object of the present invention is to provide a bumper guard attachment which is shiftable from a position of use, guarding and protecting the bumper of a vehicle, to a position completely out of sight behind the bumper.

Another object of the present invention is to provide a bumper guard attachment which is neat and attractive in appearance when in the extended or protecting position and one which may be fabricated in such form as to blend with the bumper and style of the vehicle to which it is attached.

A further object of the present invention is to provide a bumper guard attachment which is sturdy in construction, one simple in structure suitable for attachment to any vehicle bumper, and one which is highly effective in action.

Figure 1:
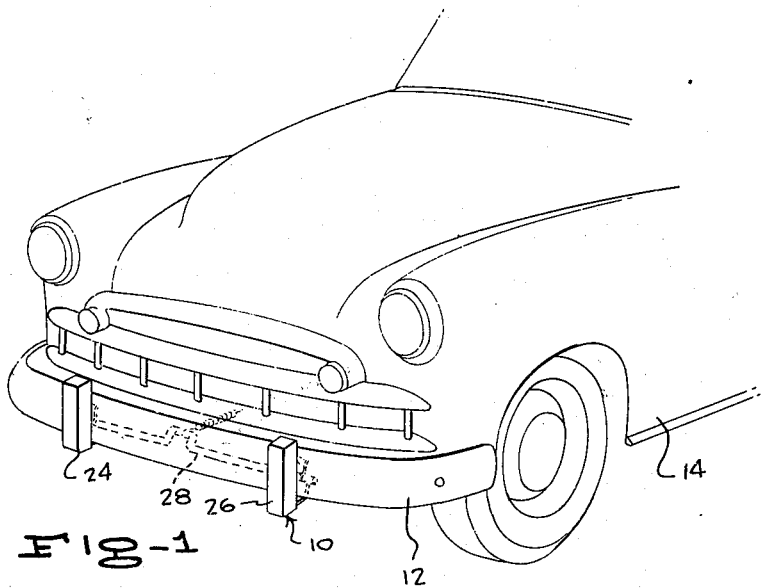
Figure 2:
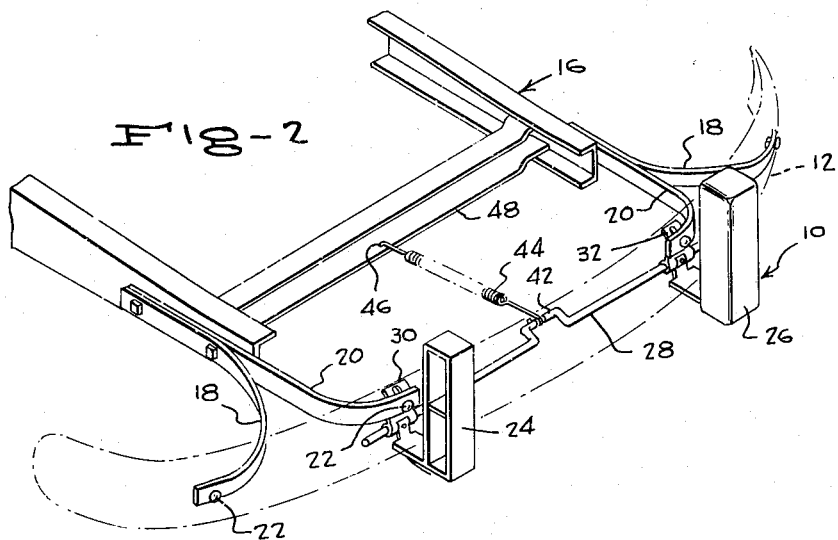

These and other objects and advantages of the present invention will be fully apparent from the following description when taken in conjunction with the annexed drawings, in which:

Figure 1 is a fragmentary isometric view of a portion of an automobile showing the bumper guard attachment of the present invention installed thereon and in operative or protecting position, Figure 2 is a fragmentary isometric view of the vehicle frame, the bumper being shown in dotted lines and the attachment of the present invention secured thereto, Figure 3 is a sectional view, on an enlarged scale, of the attachment of the present invention, Figure 4 is a view taken on the line 4—4 of Figure 3, Figure 5 is a view taken on the line 5—5 of Figure 4, and Figure 6 is an isometric exploded view of the bumper attachment posts with the attaching element used therewith.

Referring in greater detail to the drawings in which like numerals indicate like parts throughout the several views, the bumper guard attachment of the present invention is designated generally by the reference numeral 10 and is for use with either a front or rear bumper of an automobile or other vehicle, the attachment being illustrated as being attached to the front bumper 12 of an automobile 14, the forward end portion of which is shown in Figure 1.

The bumper 12 is shown in Figure 2 to be supported in spaced relation across the end of the frame 16 of the automobile 14 and the free ends of support members 18 and 20 on each side of the frame 16. Conventionally, bolts 22 extend through the bumper 12 and through the free end portions of the support members 18 and 20 for securement of the bumper 12 to the members 18 and 20.

The attachment 10 comprises a unitary structure including at least two spaced posts 24 and 26 which are positioned so as to bear against the front face of the bumper 12 intermediate the ends thereof. Means pivotally connects the posts 24 and 26 to the bumper 12 for simultaneous movement of the posts about a common horizontal axis located adjacent the lower ends of the posts and beneath the bumper 12 from the aforesaid position to a position in which the posts 24 and 26 are adjacent the rear face of the bumper 12. Specifically, a pair of identical brackets 30 and 32 are supported upon bolts 22 which attach the bumper 12 to the members 20. The common horizontal axis or a horizontally disposed tie bar 28 is rotatably supported in the lower ends of the brackets 30 and 32, the lower ends of the brackets being located adjacent the lower ends of the posts and beneath the bumper 12, and the posts 24 and 26 are connected to the tie rod 28 for movement therewith.

As shown in Figures 4 and 6, the bracket 30 is provided with a slot 34 receiving the bolt 22, the slot 34 permitting adjusting the bracket 30 to accommodate the attachment 10 to variously styled bumpers of vehicles. The lower end portion of the bracket 30 is bifurcated to receive the sleeve portion 36 carried on the free end of an extension member 38 formed integrally and projecting rearwardly from the lower end of the post 24. The post 26 is similarly provided with a sleeve portion for attachment to the bracket 32. The tie bar extends through the bifurcated lower end portions of the brackets 30 and 32 and through the associated sleeve portions, connecting the posts 24 and 26 together for movement from the full line position in Figure 3 to the dotted line position adjacent the rear face of the bumper 12. A locking screw 40 secures the sleeve portion 36 to the adjacent part of the tie bar 28.

The tie bar 28 is provided intermediate its ends with a crank portion 42 around which is secured one end of a coil spring 44 which is under tension and has its other end formed with a hook and engaged in a hole 46 provided in the front member 48 of the frame 16. The spring 44 constitutes spring means operatively connecting the tie bar 28 to the frame 16 for holding the posts 24 and 26 in either the position forwardly of the front face of the bumper 12 or adjacent and rearwardly of the rear face of the bumper 12.

Preferably, each bracket 30 and 32 is fabricated of strap steel having its lower end portions coiled to form sleeve elements 50 closed by welding, as at 52 in Figure 6.

In a preferred form of the invention, each post 24 and 26 is fabricated of rigid steel beam or plate and covered with a protective sheathing 54, as shown in Figure 3. In use, one or more posts may be attached to the bumper of an automobile in the manner described for protecting the bumper from damage when pushing a stalled vehicle or when in dense traffic or parking. Preferably, two posts are employed, each inwardly of the end of the bumper of the automobile and on either the front or rear ends, or both ends of the automobile, as desired. The posts 24 and 26 are manually shiftable from the position forwardly of the front face of the bumper 12 to the position rearwardly of the rear face of the bumper 12. The crank portion 42, in combination with the spring 44, has an over-center action securely holding the posts 24 and 26 in either of their positions.

What is claimed is:

The combination with a vehicle frame and a bumper extending across and spaced from one end of said frame, said bumper having a front face and a rear face, of a guard attachment comprising at least two posts each positioned so as to bear against the front face of said bumper intermediate the upper and lower ends thereof, a horizontally disposed tie bar located adjacent the lower ends of said posts and beneath said bumper and rotatably supported on said bumper, means securing the lower ends of said posts to said tie bar for movement with the latter, said tie bar being rotatable to simultaneously move said posts from the aforesaid position to a position adjacent the rear face of said bumper, and a coil spring connecting said vehicle frame to the intermediate part of said tie bar for holding the posts in either of said positions.

References Cited in the file of this patent

UNITED STATES PATENTS

| | | |
|---|---|---|
| 2,145,814 | McAdams | Jan. 31, 1939 |
| 2,146,642 | Mueth | Feb. 7, 1939 |
| 2,177,190 | Sandberg | Oct. 24, 1939 |
| 2,230,516 | Radtke | Feb. 4, 1941 |
| 2,283,464 | Sandberg | May 19, 1942 |
| 2,601,993 | McCall | July 1, 1952 |